US009110496B1

(12) United States Patent  (10) Patent No.: US 9,110,496 B1
Michelsen                        (45) Date of Patent:     Aug. 18, 2015

(54) DYNAMIC PROVISIONING OF A VIRTUAL TEST ENVIRONMENT

(75) Inventor: John J. Michelsen, Irving, TX (US)

(73) Assignee: INTERACTIVE TKO, INC., Dallas, TX (US)

( * ) Notice: Subject to any disclaimer, the term of this patent is extended or adjusted under 35 U.S.C. 154(b) by 506 days.

(21) Appl. No.: 13/155,371

(22) Filed: Jun. 7, 2011

(51) Int. Cl.
  *G06F 11/30* (2006.01)
  *G06F 1/00* (2006.01)

(52) U.S. Cl.
  CPC ........................................ *G06F 1/00* (2013.01)

(58) Field of Classification Search
  USPC .......................................................... 702/186
  See application file for complete search history.

(56) References Cited

U.S. PATENT DOCUMENTS

| | | |
|---|---|---|
| 5,450,586 A | 9/1995 | Kuzara et al. |
| 5,581,696 A | 12/1996 | Kolawa et al. |
| 6,002,871 A | 12/1999 | Duggan et al. |
| 6,249,882 B1 | 6/2001 | Testardi |
| 6,473,707 B1 | 10/2002 | Grey |
| 6,587,969 B1 | 7/2003 | Weinberg et al. |
| 6,601,020 B1 | 7/2003 | Myers |
| 6,668,371 B2 | 12/2003 | Hamilton et al. |
| 7,392,507 B2 | 6/2008 | Kolawa et al. |
| 2004/0025083 A1 | 2/2004 | Nanja et al. |
| 2004/0068560 A1 | 4/2004 | Oulu et al. |
| 2004/0123272 A1 | 6/2004 | Bailey et al. |
| 2004/0225919 A1 | 11/2004 | Reissman et al. |
| 2006/0048100 A1 | 3/2006 | Levy et al. |
| 2006/0059169 A1 | 3/2006 | Armishev |
| 2009/0300423 A1* | 12/2009 | Ferris ............................... 714/38 |

OTHER PUBLICATIONS

Simon Ostermann, A Performance Analysis of EC2 Cloud Computing Services for Scientific Computing, D.R. Avresky et al. (Eds.): Cloudcomp 2009, LNICST 34, pp. 115-131, 2010. Institute for Computer Sciences, Social-Informatics and Telecommunications Engineering 2010.*
Taking Testing to the Cloud, cognizant reports | Mar. 2011, p. 1-8.*
HP, Performance testing in the cloud, Performance testing in the new world of cloud computing, Dec. 2009, 12 pages.*
Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Oasis, "ebXML Test Framework DRAFT Document—Version 0.91", Dec. 2002, The Organization for the Advancement of Structured Information Standards, 92 pages.

* cited by examiner

*Primary Examiner* — Tung S Lau
(74) *Attorney, Agent, or Firm* — Patent Capital Group

(57) ABSTRACT

At least one test of a first computing system is launched utilizing a second computing system that includes a first set of computing devices. Progress of the test is monitored during a first period of time. Performance of the second computing system is also monitored during the first period. An additional second set of computing devices is automatically provisioned for inclusion in the second computing system based at least in part on the monitoring of the test progress and monitoring of the performance of the computing system during the first time period. The test can utilize the first and second sets of computing devices during a second period of time subsequent to the first period.

21 Claims, 14 Drawing Sheets

DYNAMIC PROVISIONING OF A VIRTUAL TEST ENVIRONMENT

TECHNICAL FIELD

This disclosure relates in general to the field of computer systems testing and, more particularly virtual test environments.

BACKGROUND

Virtualization and cloud computing have been increasing in popularity. Hardware virtualization has been used, for instance, to run multiple copies of an operating system as virtual machines (VMs) within a single, physical hardware device. Hardware virtualization can offer cost, flexibility and risk management benefits for the applications utilizing the virtualized hardware. Virtual endpoints have been used, for instance in service-oriented architectures (SOA), allow the SOA to define virtual locations for services that need to be invoked, while shielding the actual end point of the service itself. This can be used, for instance, to allow for the physical address (or URL) of a service to be changed, depending upon when and how the service is used as part of a given workflow. Virtualized services themselves have also been developed (e.g., in iTKO Corporation's LISA™ testing suite) and described, such as in U.S. patent application Ser. No. 12/242,783 to Michelsen (filed Sep. 30, 2008). Virtual services can be constructed synthetically from WSDL, or modeled from existing services and underlying implementations, and can be used to streamline testing, development, and deployment practices as a whole.

SUMMARY

This specification describes technologies relating to automatic provisioning of a test server system. In general, one aspect of the subject matter described in this specification can be embodied in methods that include the actions of launching at least one test of a first computing system utilizing a second computing system including a first set of computing devices and monitoring progress of the test during a first period of time. Performance of the second computing system can also be monitored during the first period. An additional second set of computing devices can be automatically provisioned for inclusion in the second computing system based at least in part on the monitoring of the test progress and monitoring of the performance of the computing system during the first time period. The test can utilize the first and second sets of computing devices during a second period of time subsequent to the first period.

These and other embodiments can each optionally include one or more of the following features. The first and second sets of computing devices can be remote from the first computing system. The second computing system can execute at least one instance of a virtual test lab configured to simulate a set of interactions with the first computing system, and the virtual test lab can be executed on at least one of the first set of computing devices. Automatically provisioning the second set of computing devices can include replicating instances of the virtual test lab on at least some of the second set of computing devices. Each instance of the virtual test lab can be executed using at least one first virtual machine and a virtual instance of the first computing system is tested, the virtual instance of the first computing system executed using at least one second virtual machine. Monitoring the test during the first time period can include predicting requirements of the test in the second period of time and the second set of computing devices can be provisioned based, at least in part, on the predicted requirements of the test. Monitoring performance of the second computing system can include monitoring computing capacity of the first set of computing devices. Computing capacity can relate to at least one of processing capacity of computing devices in the second computing system, available network bandwidth within the second computing system, and available memory of computing devices in the second computing system. The first and second sets of computing devices can be provisioned from a plurality of cloud-based server devices. Performance of the second computing system can be monitored during the second period, the second computing system including the first and second sets of computing devices. It can be determined, based at least in part on monitoring performance of the second computing system during the second period, whether additional computing devices should be added to the second computing system in a third period subsequent to the second period. It can be determined, based on the monitoring of the second computing system during the second period, that at least a portion of the computing devices provisioned to the second computing system be at least temporarily de-allocated from the second computing system.

Further, embodiments can each optionally include one or more of the following features. At least one particular computing device, remote from the first computing system and within the second computing system, can execute at least one test coordinator engine managing the test. The at least one test coordinator engine can monitor the test, monitor performance of the second computing system, and initiate dynamic provisioning of additional computing devices for inclusion within the second computing system during the test. User-defined parameters can be identified for the test, where dynamic provisioning of additional computing devices for inclusion within the second computing system during the test is based at least in part on the parameters. Parameters can include a monitoring rate defining when performance of the second computing system should be monitored in connection with a decisions to initiate dynamic provisioning of addition computing devices for inclusion within the second computing system during the test, an initial system size for the second computing system, and/or a maximum system size for the second computing system, wherein the second computing system will not be automatically provisioned with additional computing devices in excess of the maximum system size. The at least one test can include a plurality of tests, the plurality of tests including a first test and a second test executed at least partially in parallel. Each test in the plurality of tests can have a corresponding test coordinator engine executed on the second computing system. Monitoring the at least one test can include determining whether additional computing devices should be automatically provisioned to accommodate execution of test coordinator engines for at least the first and second tests. User-defined parameter can be identified including instructions for completing each of the plurality of tests within a particular time period, the particular time period including at least the first and second periods of time. Performance the second computing system during the first period can be monitored to determine whether additional computing devices should be automatically provisioned for inclusion in the second computing system in order to the plurality of tests within the particular time period. Performance of the second computing system can be monitored substantially continuously during the test and decisions to automatically provision the second computing system with additional computing devices are made substantially periodically.

Particular embodiments of the subject matter described in this specification can be implemented so as to realize one or more of the following advantages. For instance, dynamic provisioning of a test lab can increase efficiency in setting-up and executing a test of a computing system, among other advantages. For example, rather than spending time and potentially wasting human and computing resources determining and allocating a sufficient or optimized amount of testing hardware for a test, test servers can be automatically provisioned, from the cloud in substantially real time while a test is being run, in order to identify a sufficient or optimized amount of test hardware.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
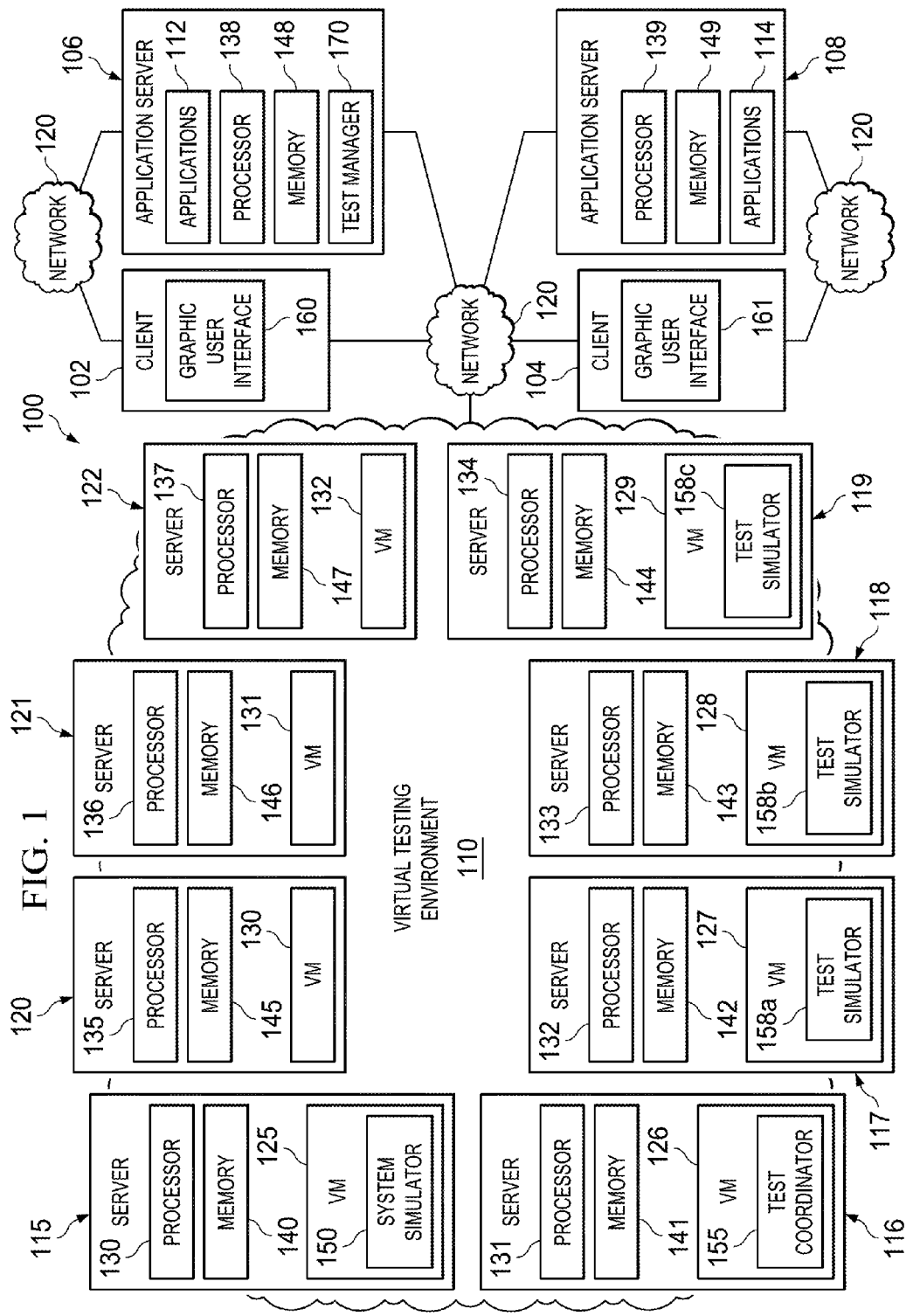
FIG. 1 illustrates an example system including a virtual test environment.

Virtual test environments, or labs, can be implemented using a plurality of computing devices, including computing devices within a cloud-based computing environment or network. In typical software tests, considerable time can be devoted to determining the hardware requirements of the very system responsible for performing the test. Properly provisioning the test lab with the proper hardware and software resources can be critical, as development decisions involving the system under test can be based on the results of the test. Accordingly, if a test lab is provisioned incorrectly or inadequately, the accuracy and efficacy of test results generated by the test can be unreliable or imprecise. For instance, if a test lab is implemented using a hardware system that cannot perform at a level required for the test, the test can fail or manifest as a bottleneck in interactions between the testing system and the system under test. Traditionally, fear of inadequately provisioning the hardware for a test environment has resulted in lengthy analyses and/or over-provisioning of hardware resources to ensure that there is enough hardware available to implement the test. Indeed, in some instances, the test system is itself tested to ensure that it is correctly provisioned. Such approaches, however, can be expensive and inefficient. For instance, lengthy and expensive simulations and testing of the testing system can be conducted simply to determine a minimum number of servers needed to perform a test. In many instances, testing administrators elect to purchase a quantity of test hardware well in excess of what will likely be needed, in order to ensure that enough test hardware is available. Over-provisioning can be particularly inefficient, however, given the time and human resources required to provision the (over-)allocated servers with the test simulation and management software specific to the test, as well as repurposing the servers once the test is completed, using traditional techniques.

In improved implementations, the hardware implementing the test can be monitored while the test is running to ensure that the testing hardware is able to handle the loads introduced through execution of the test. Statistical data can be collected during the test to forecast trends both within the test's progress as well as with the testing hardware. Statistical data and trend calculations can then be used to determine whether the set of hardware originally-provisioned for the test is adequate to accurately complete the test. Based on this assessment, additional hardware can be quickly and dynamically (e.g., automatically) allocated and provisioned, in real time, from a pool of available hardware resources, such as a pool of available cloud servers, to address the forecasted need. In other instances, forecasted trends can indicate that too much hardware has been provisioned for a given test, allowing the test environment to dynamically release and tear down excess servers for use by other users, systems, or, indeed, other tests.

Turning to the example implementation of FIG. 1, the illustrated computing system 100 includes, or is communicably coupled with, one or more clients 102, 104, one or more application (or application development) servers (e.g., 106, 108), such as application servers within an enterprise software environment, for instance, using one or more networks 120. The system 100 can further include a virtual test environment 110 adapted to implement one or more tests on computing systems and applications, such as systems and applications (e.g., 112, 114) hosted, developed, or otherwise available through application servers 106, 108, including other systems upon which the applications depend, such as an SOA, composite software system, enterprise software system, or other system or subsystem. The virtual test environment 110 can be implemented, at least in part, on a plurality of computing devices, such as servers (e.g., servers 115-122) in a server farm, server pool, cloud system, etc. Portions of the virtual test environment can also be executed persistently, for instance, on clients 102, 104 and/or servers 106, 108. Servers 115-122 in virtual test environment 110 can be dedicated testing servers, or general purpose computing devices, such as cloud servers available on demand through one or more cloud computing services.

In general, each of "servers" 106, 108, 115-122 can comprise electronic computing devices operable to receive, transmit, process, store, or manage data and information associated with the software system 100. As used in this document, the term "computer" or "computing device" is intended to encompass any suitable processing device. For example, the system 100 may be implemented using computers other than servers, including server pools. Further, any, all, or some of the servers 106, 108, 115-122 may be adapted to execute any operating system, including Linux, UNIX, Windows Server, etc., as well as virtual machines (e.g., 125-132) adapted to virtualize execution of a particular operating system, including customized and proprietary operating systems.

Servers 115-122 and other computing devices (e.g., 115-122) in virtual testing environment 110 can each include one or more processors (e.g., 130-137), computer-readable memory (e.g., 140-147), and one or more interfaces. Each server can further include code that creates an execution environment for the computer program in question, such as one or more virtual machines ("VMs") (e.g., 125-132). Additional software modules, applications, simulators, and functionality can also be executed on servers 115-122, including within virtual machines 125-132. In some instances, a virtual test lab corresponding to a particular test of a particular computing system, application, or software component can be implemented by using one or more computing devices in virtual testing environment 110. For instance, in one example, a system under test can be virtualized as a system simulator 150 executed on a virtual machine 125 on one or more servers (e.g., 115) in the virtual testing environment 110. One or more other servers (e.g., 116) can be used to execute a test coordinator 155 adapted to monitor and manage the test on the system modeled in system simulator 150. Additionally, one or more instances of a test simulator (e.g., 158*a-c*) can be provisioned on one or more servers (e.g., 117-119) of virtual testing environment 110, each test simulator adapted to perform or model an interaction or transaction with the system under test (e.g., a virtual system simulator 150) and perform operations and simulations in connection with the particular test. Test coordinator 155 can monitor performance of the test, as well as performance of test simulators 158*a-c* and computing devices (e.g., 117-119) used to implement the simulators 158*a-c* to ensure the test proceeds as it should, including initiating and directing the provisioning of additional servers (e.g., 120-122), if necessary, to complete the particular test, or a plurality, or suite, of tests. In some implementations, persistent test environment modules, such as a test manager 170 can also be provided, to assist with the monitoring and management of tests and allocated resources (such as servers 115-119), including the dynamic provisioning of additional test servers (e.g., servers 120-122).

In some instances, a particular system can be tested using virtual testing environment 110 by virtualizing the system and components under test into virtual services, allowing the test to be run on a dedicated, virtualized clone (or simulator 150) of the system under test, rather than the live system itself. Virtualizing the system under test, including the system's dependencies, as well as the can be advantageous, so as to more fully leverage the extensible capacity of a testing environment utilizing an on-demand computing architecture, such as a cloud service. As an example, a particular system under test, such as an order management system, may require access to a mainframe. It may not be desirable, or feasible, however, to provision the entire mainframe on the cloud. Unfortunately, if the mainframe is a constrained system and/or off-cloud, virtualizing other system components on the cloud infrastructure may do little to increase the capacity and efficiency of the overall test environment. Indeed, virtualizing and provisioning additional capacity in the front-end architecture under test can be handicapped by backend capacity issues that cannot or may not be available for virtualization.

In some instances, the behavior of large, constrained, third-party, or other "out-of-scope" systems not easily virtualized, can be modeled or simulated using virtual services so that a virtualized in-scope system believes it is talking to the live out-of-scope system modeled by the virtual services. A virtual service can be used to bring all of the needed systems into the cloud. In-scope systems can be provisioned with virtual machines, and out-of-scope systems provisioned as virtual services in order to bring an entire test lab into the cloud. In some instances, capturing or generating a virtual service can include recording live traffic between an in-scope system and its immediate dependencies. The recorded traffic can be used to create a model (or virtual service) of the dependencies, such as described, for example, in U.S. patent application Ser. No. 12/242,783 to Michelsen (filed Sep. 30, 2008). Generated virtual services can then stand in place for the live system and be used in the virtual testing of the system (and dependencies). As a result, in instances where live virtual machines are provisioned for in-scope systems (e.g., a system under the user's control), and virtual services are provisioned for the out-of-scope systems (that would otherwise have required off-cloud connectivity), elastic capacity consumption and provisioning efficiency of a fully cloud-based testing environment can be realized.

Application servers 106, 108 can each include one or more processors 140, 142, computer-readable memory 150, 152, and one or more interfaces. Application servers 106, 108 can include any suitable software component or module, or computing device(s) capable of hosting and/or serving a software application (e.g., 112, 114), including distributed, enterprise, or cloud-based software applications. For instance, application servers can be configured to host, serve, or otherwise manage web services or applications (e.g., 112, 114), such as SOA-based or enterprise web services, or applications interfacing, coordinating with, or dependent on other enterprise services. Application and services 112, 114 provided through application servers 106, 108 can further include web services under development. In some instances, some combination of one or more of application servers 106, 108 can be hosted on a common computing system, server, or server pool, and share computing resources, including shared memory, processors, and interfaces, such as in an enterprise software system serving services to a plurality of distinct clients and customers.

The illustrated implementation of FIG. 1 further includes one or more local and/or remote clients 102, 104. A client 102, 104 can be any computing device operable to connect or communicate at least with an application server 106, 108, network 120, and/or virtual testing environment 110 (e.g., via test manager 170) using a wireline or wireless connection. Each client 102, 104 can include at least one graphical display device and user interfaces (e.g., 160, 162), allowing a user to view and interact with graphical user interfaces of test management software. Such graphical user interfaces can include interfaces for use in launching a test, providing instructions and parameters for a test, editing or otherwise modifying a test, viewing details and progress of a test, viewing health of the test system, viewing the provisioning of hardware resources for a test, etc. In general, the client 102, 104 can include any electronic computing device operable to receive, transmit, process, and store any appropriate data associated with the software environment of FIG. 1. It will be understood that there may be any number of clients 102, 104 associated with system 100, as well as any number of clients 102, 104 external to system 100. Further, the term "client" and "user" may be used interchangeably as appropriate without departing from the scope of this disclosure. Moreover, while each client 102, 104 is described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditionally, a common use case for cloud infrastructure was in-production implementation of software systems. The elastic capacity and run time management capabilities of cloud-based systems can also be leveraged for in-development use cases, as well as test labs. Cloud can realize efficiencies in instances where the volatility of demand varies among a variety of uses of a particular infrastructure. For instance, different applications have different capacity needs over time. The ability to leverage one common resource pool among many teams, projects, and test can give the appearance of higher capacity on a per team or project basis, when in reality, the unused capacity of other teams or projects is being used. Further, during development, multiple pre-production, development, reduction, and test labs can be utilized in connection with a single production infrastructure. Each of such labs can additionally have a volatile demand for capacity. Additionally, provisioning volatility can be particularly high within preproduction development labs, in some instances as high as in production infrastructure. Accordingly, cloud provisioning capabilities can be leveraged within pre-production use cases.

Leveraging cloud infrastructure for preproduction use can further include pooling the resources of several pre-production and testing teams that will be leveraging the infrastructure together. This can include establishing a single environment from the collective resources of several environments involved in a particular production effort. Accordingly, a virtual environment, or lab, provisioning system can be implemented to dynamically provision pre-production needs for computing resources. In some instances, one or more catalogs can be maintained of all the computing resources included within the single environment. Such a catalog can further consist of virtual machine images of each of the systems and resources the various pre-production teams and personnel may need at any given time during pre-production or testing. The virtual lab provisioning and management system can then allow administrators to leverage the components to realize pre-production goals, tests, and other tasks. Further, additional virtual machine images can be added to the catalog, extending the scope of the provisioning system while potentially doing away with the need for additional physical hardware above and beyond that provided by the cloud.

In one example, one or more development or testing teams can have their catalog of virtual machines provisioned dynamically, onto one or more virtual machines. The provisioning of a set of images on virtual machines can be referred to as a "virtual lab." Such a lab can be provided, for example, through a virtual lab management solution, as a self-contained unit that can be provisioned, decommissioned, and secured altogether. Further, unlike some traditional testing environments that take days or in some cases weeks to build and provision using traditional techniques, a virtual test lab can be set up using a virtual lab management solution, with the acquisition and installation of hardware and base software reduced from weeks or months to, in some cases, minutes or seconds.

To further leverage the elastic capacity for performance testing computing systems and software products, a virtual lab management solution can be provided that is further capable of self-monitoring to ensure that inefficiencies and errors in the virtual lab management solution do not influence or corrupt the returned test results. Such self-monitoring can enable a performance testing tool to understand its own load generation and resource consumption in order to then make predictions with regard to how much, if any, additional resources may need to be allocated, from the cloud, to meet the performance testing requirements for a particular test. Having such awareness, a testing tool can then go to the cloud and provision the additional resources on an effectively as-needed basis, and apply the configuration and testing assets of the test lab to those additional, dynamically-provisioned machines, thereby seamlessly integrating them into the test lab as the test is running. Such capabilities can be used to further leverage cloud infrastructure for performance testing in an on-demand, utility type fashion.

Figure 2:
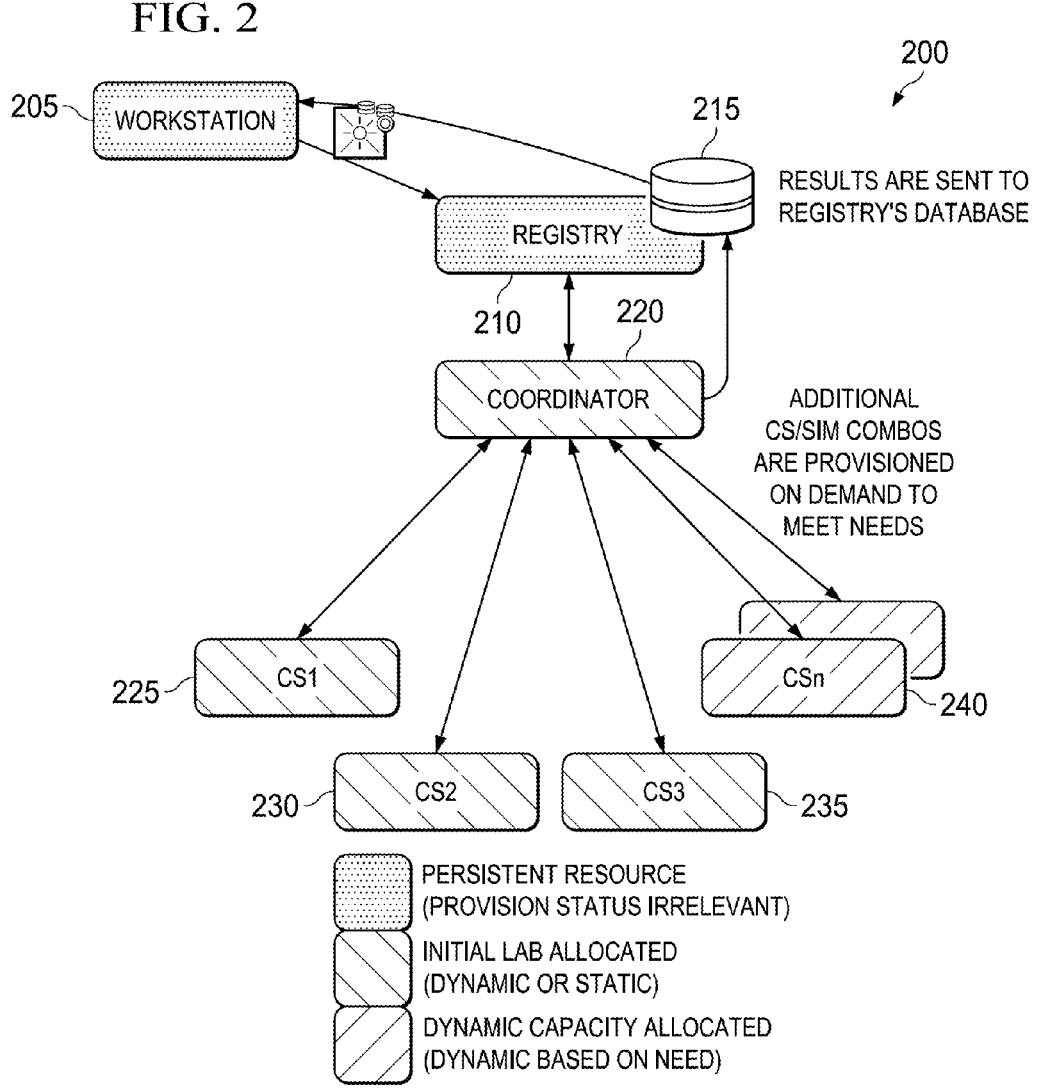
FIG. 2 is a schematic representation of an virtual test environment.

Turning to FIG. 2, a schematic representation 200 is shown of a virtual testing environment 110 performing a particular example virtual test. In this particular example, a user of a client workstation 205 can interact with a test manager 210 to initiate a virtual test lab executed on a set of computing devices included in a server pool or cloud architecture. A registry 215, including one or more data stores, can be provided in connection with the test manager 210, for instance, to receive, store, and manage test results returned from one or more tests. The test manager 210 can be executed on a computing device communicatively coupled to the client workstation 205, such as a device (e.g., 106) associated with development of a particular software system or component. In other instances, test manager 210 can be executed locally on the workstation 205 or remotely and provided to the user of the workstation as a service. In any event, the test manager 210 can be executed on one or more persistent computing resources. In connection with the launching of a virtual test lab to test a particular software system or element, including systems and services executed as virtualized hardware, systems, and services, a virtual test lab coordinator 220 can also be provisioned dynamically, together with one or more test simulators 225, 230, 235. Additional simulators (e.g., 240) can be provisioned for the test, on demand and as needed, by allocating and provisioning additional cloud-based computing devices with images of the test simulators used in the test.

In some instances, one or more users using workstation 205 can launch a particular lab in the cloud simply by starting a testing activity. In some instances, launching a particular test lab can include staging the entire test to run in the cloud. In such instances, there would be no requirement for using off-cloud hardware to perform the test. The workstation 205 can interface with test manager 210 in the launching of a test. The test manager 210 can provision virtual-machine-based development and test labs, and coordinate and launch corresponding virtual service environments (VSEs) and automated regression and performance test servers in the cloud for use during the test.

In some instances, provisioning and launching a test lab, using test manager 210, can include utilizing elements and functionality including a hypervisor to host machine images (e.g., using a Platform as a Service (PaaS) offering), a provisioning facility to manage and orchestrate the test environment (e.g., using an Infrastructure as a Service (IaaS) offering), and service virtualization tools, such as iTKO's LISA™ testing product, to solve for issues specific to cloud-based test labs as well as issues related to off-cloud, unavailable, costly, or highly data-volatile systems that a test or team depends upon during testing (and/or development generally). In preferred embodiments, the test lab, including coordinator 220 and simulators 225, 230, 235, 240 can be completely self-contained in the cloud. While live, off-cloud systems and dependencies can be utilized during testing, such dependencies can negate certain rapid provisioning and capacity benefits realized in purely cloud-based labs. Virtualization of both the in-scope system resources as virtual machines, and the capture and simulation of off-cloud or unavailable resources as virtual services, can allow developers, testers and performance engineering teams to work in parallel at a fraction of the expected infrastructure cost.

In some instances, test manager 210 can access and identify, from a catalog, or other collection of pre-production resources (in some cases, from several different development teams leveraging the infrastructure together), a set of pre-production resources, and/or images of such resources needed for a particular virtual test lab. The test manager 210 can identify a particular pre-defined test or test lab module and dynamically provision one or more allocated computing devices with the test lab resources, including images and simulators, corresponding to the requested test or test lab on the cloud. Dynamic provisioning of resources can include provisioning cloud-based resources with virtual assets (e.g., from the catalog) representing or virtualizing physical or "real world" computing resources needed for the test.

Each virtual test lab or test can include a corresponding test coordinator 220 adapted to interface with the test manager 210, transmit test results to the test manager (e.g., for storage in registry 215), as well as monitor performance of the test together with performance of the cloud-based computing devices used to implement the test lab. The test coordinator 220 can monitor the progress of the test, such as by monitoring how quickly a test is being completed, as well as by predicting and managing subsequent test steps or flows. For instance, in a load testing test lab that will apply a varying load to the system under test, the test coordinator 220 can monitor progress of the test both from a historical perspective (based on the portion of the test already been completed) as well as predictively, anticipating subsequent steps in the test. Continuing with the load testing example, the test coordinator 220 can note performance status of a test during a first portion of the test modeling a load of 10,000 virtual users and note further that a subsequent portion of the test will increase the load to 50,000 virtual users. Consequently, the test coordinator 220 can gather and analyze, continuously and in real time, statistical data generated during monitoring of the test and predict, using this statistical data, how expected subsequent test events or stages will affect performance of the test.

In addition to monitoring the status of its corresponding test, a test coordinator 220 can monitor the cloud-based hardware implementing aspects of the test and test lab, including hardware implementing simulators 225, 230, 235, 240. Simulators 225, 230, 235, 240 can model various systems, users, operations, and events interacting with or affecting the system under test. Continuing with the load test example, simulators 225, 230, 235, 240 can simulate client systems requesting and consuming services provided by the system under test. Depending on the specific requirements and steps of a particular test, the test lab itself can be subject to varying capacity requirements during the course of a test, as some test steps and operations (modeled by simulators 225, 230, 235, 240) can be more resource-intensive that others. In order to mitigate against the test lab under- or incorrectly-performing, the test coordinator 220 can monitor the cloud hardware implementing the simulators 225, 230, 235, 240 to ensure that sufficient resources have been allocated to successfully and efficiently complete the test (or a suite of tests). For instance, the test coordinator 220 can monitor the "health" of each of the cloud-based (or server-pool-based) computing devices initially allocated for the test and determine whether the devices have been over- or under-allocated to the needs of the test generally or during a certain period in the test. Determining the health of the computing devices can include monitoring network (e.g., bandwidth) capacity and performance, processor (e.g., CPU) capacity and performance, memory (e.g., heap) capacity, as well as the respective loads (including network, processing, and memory loads) borne by each of the computing devices during the test. In some instances, a composite health score can be generated for a computing device from a plurality of factors. The health (and load) of a particular computing device allocated for a particular test can depend on a number of factors, including the particular task(s) or simulator(s) executed using the device, the individual hardware and network characteristics of the particular device, and the extent to which, if any, the particular computing device is being used for other, parallel tasks.

If the test coordinator 220 determines that the set of computing devices used in the test is incorrectly (i.e., over- or under-) allocated, the test coordinator 220 can dynamically provision additional computing devices with additional simulators, for instance, or tear-down previously-used computing devices, in accordance with the determination. Additionally, the test coordinator 220 can manage the allocation of computing devices predictively. As an example, the test coordinator 220 need not wait for one or more computing devices used in the test to enter a critical health state or begin underperforming before initiating the provisioning of additional computing devices. For instance, the test coordinator can begin collecting statistical data during the beginning moments or periods of a test and make predictions, based also on the expected progression of the test, whether the current allocation of computing devices is likely to be sufficient or optimal over the short- or long-term duration of the test. Accordingly, the test coordinator 220 can proactively allocate additional computing devices (or de-allocate computing devices) in the set based on statistical data collected during earlier phases of the test.

Figure 3:
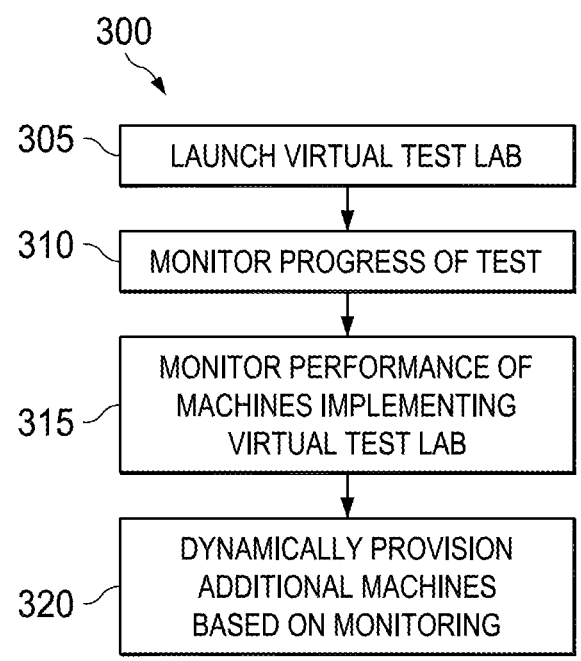
FIG. 3 is a flowchart of an example technique for dynamically allocating computing devices for use in a virtual test environment.

Turning to FIG. 3, a flowchart 300 is shown illustrating an example technique, performed, for example, by test coordinator 220 and/or test manager 210, in connection with the dynamic provisioning of computing devices in connection with an example virtual test. At least one virtual test can be launched 305 to test aspects, components, hardware, module, subsystems, etc. of a computing system under test. The test can utilize a second computing system, such as a cloud-based service or test server pool that includes a plurality of computing devices that can be allocated for the test on-demand. Progress of the test can be monitored 310 during a first period of time. Performance of the second computing system can itself be monitored 315 during the first period. Based at least in part on the monitoring of the test progress and monitoring of the performance of the computing system during the first time period, an additional set of computing devices can be dynamically provisioned 320 for inclusion in the second computing system for use in continuing performance of the test during a second period of time subsequent to the first period.

Figure 4A:
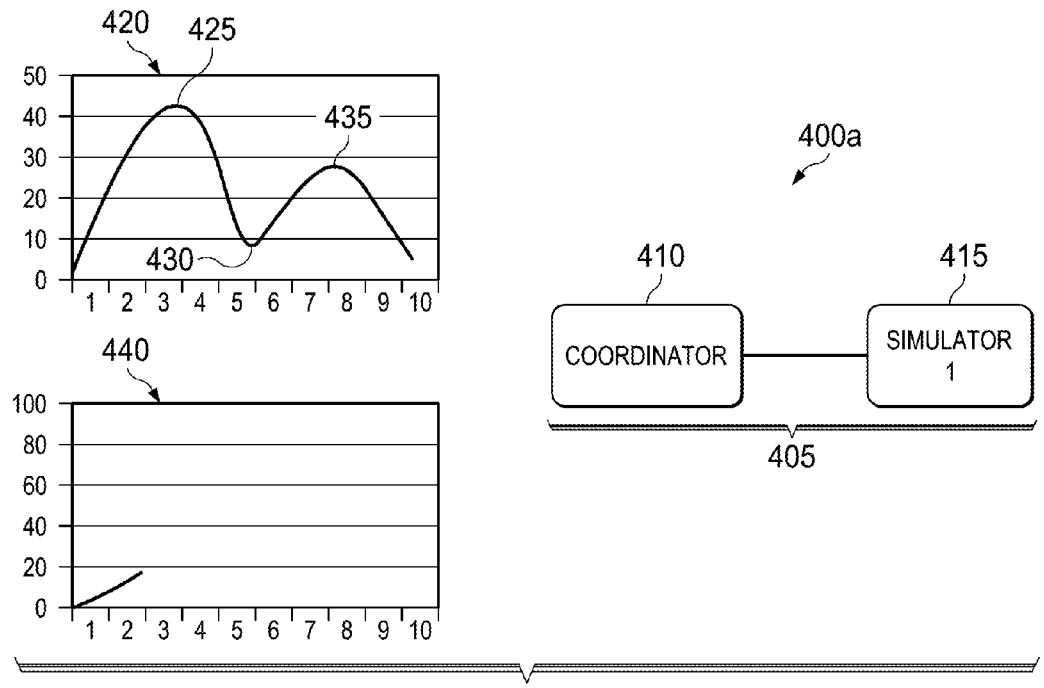
FIGS. 4A-4E illustrate representations of example dynamic allocating of computing devices for use in a virtual test environment.

Turning to FIGS. 4A-4E, simplified block diagrams 400a-e are shown illustrating some potential operations associated with the present disclosure. In the examples of FIGS. 4A-4E, an example load test is performed using virtual testing systems and according to principles similar to those described above. In some instances, virtual load performance testing can be well-suited to a cloud-based or on-demand hardware provisioning environment. In the implementation of FIG. 4A, a virtual test lab 405 includes a test coordinator tool 410 and one or more initial simulators 415 simulating load on the system under test. In this example, and for simplicity, each of test coordinator 410 and simulator 415 are executed on distinct computing devices allocated and provisioned for the test from a plurality of available computing devices. Test coordinator 410 can be responsible for managing a particular load performance test according to load profile 420 that initially ramps up to a first peak load 425, drops to a first trough 430, then ramping back up to a second peak 435 before concluding (e.g., at time t=10).

Further, the health or performance of the hardware implementing the test can be monitored in whole or in part (e.g., in cooperation with a persistent test manager tool) by the test coordinator 410. As shown in FIG. 4A, represented by the graph 440, the health of the computing device implementing the initial simulator 415 is monitored. The health of the computing device can be based on the capacity of the device, including its remaining bandwidth, memory, and processing capacity. In the example of FIG. 4A, when the test first begins, an initial period of the test's execution can be monitored to develop a statistically meaningful set of test and hardware performance data, upon which future hardware assessment decisions and forecasts can be based. Accordingly, performance of the test and test hardware can be continuously monitored by the test coordinator 410 in order to develop a dataset documenting performance of the test lab. Periodically, the test coordinator 410 can determine that statistically sufficient data samples have been collected to justify forecasting, calculating, or otherwise determining whether additional hardware should be allocated and provisioned, dynamically during the test, to meet the needs of the test. This allows for the test coordinator 410 to calculate, and adjust, in real time the minimum, or optimal, amount of hardware resources needed for a particular test or test period.

The test coordinator 410 can periodically assess whether the test hardware allocation is sufficient or optimal based on collected statistical data. Such assessments or the rate of such assessments can be pre-scheduled, pre-defined, or based on pre-defined rules and conditions. For instance, a user initiating the test may be aware of sections of a test that are particularly important or that the user predicts are likely to tax the test lab hardware. Accordingly, the user can predefine checkpoints for assessing the sufficiency of the test lab hardware. For instance, a user can specify that assessments be made more frequently between times t=2 through t=4 (as shown at 420) given an expectation that the capacity of the test lab hardware is most likely to be challenged during this period.

In addition to specifying checkpoints and assessment frequency, as discussed above, users can also pre-define limits for hardware allocation. Users can specify such parameters, for instance, in connection with the initiation of a test (e.g., using workstation 205). Setting a maximum limit on the amount of hardware that can be dynamically allocated by the test coordinator 410 during the test can be useful, for instance, where testing hardware resources are allocated through a cloud computing service that bills users according to the number of computing resources allocated per unit of time. While it may be ideal to ramp up the number of dynamically provisioned hardware to a certain number of servers within a particular performance test, such a test may provision hardware at a cost in excess of what the user-customer is in a position to pay. Accordingly, some control can be maintained by the user to artificially restrain the dynamic provisioning of hardware during a test, in order to address certain cost requirements. In still other examples, users can set a conditional maximum hardware allocation, specifying that the maximum may only be exceeded under certain circumstances (e.g., where adhering to the maximum would cause a test to fail, where the test is near completion, where exceeding the maximum allocation is determined to only be temporary, etc.). Further, a user can also set an initial hardware allocation for a test, in connection with launching of a test. Indeed, a user can specify a number of test parameters including the initial server outlay, server outlay limits and maximums, desired assessment points, rates, and protocols, among other parameters.

In some instances, a test (e.g., 420) can be designed to allow for a warm-up or ramp-up period at the beginning of the test, or test section, to assist the test coordinator 410 in gathering test performance statistics for a period before dynamic provisioning of additional hardware would be needed. It can be desirable to postpone decisions regarding the dynamic allocation or de-allocation of test server until at least a statistically reliable sample is collected, such as to avoid instances where a small sample of outlier data is initially gathered and then relied upon to incorrectly or prematurely provision additional hardware, or worse, de-allocate needed hardware. Further, were a test to ramp-up too quickly, in terms of its hardware resource requirements, it is possible that the health of the provisioned test hardware would reach a critical or overloaded state before statistically significant data can be collected and acted upon to stave off a critical device event. In addition to ramp-up periods built into a test flow, the test coordinator 410 can further determine or predict a minimum amount of hardware that should be allocated to the test to allow the test coordinator 410 to at least successfully complete the warm-up period (e.g. in connection with an initial server outlay specified during launching of the test).

In FIG. 4A, the performance of simulator (415) hardware can be monitored (at 440) during a ramp-up state, the capacity approaching 20% at time t=2. In these examples, "capacity" is used generically for simplicity, but in practice, can apply to the bandwidth, memory capacity, processor capacity, combined health of two or more of bandwidth, memory capacity, and processor capacity, among other considerations and measures. In the example of FIG. 4A, from the ramp-up period, it may appear to the test coordinator tool 410 that sufficient computing resources have been allocated for the load test. However, turning to FIG. 4B, it can be determined or forecast, that by time t=4 (for instance, in connection with load peak 425), the capacity of the resources is at or trending to an unacceptable level. Various thresholds can be applied in determining whether a device's capacity or capacity trend is unacceptable at any given moment in any particular test. For instance, exceeding 100% of an allocated device's memory, processing, or networking capacity can cause the device and/ or the test to fail, making it unacceptable to even flirt with exceeding devices' capacity. Accordingly, in some examples, the dynamical provisioning of additional devices can be prompted well in advance of a device meeting or exceeding its capacity. This can also help account for delays in computing or responding to a device reaching a critical state. For instance, in one example, a device may be determined to be successfully running at 80% capacity, based on statistical data collected during test monitoring that suggests operations and simulations handled by the device, on average, will not cause the device to fluctuate unpredictably from 80% to beyond 100%. This notwithstanding, the possibility may still exist, based on one or more outlying data points gathered during performance of the test, that a particular event or operation could cause a spike in load on the device, sending the device into an unacceptable state. Accordingly, thresholds for initiating dynamic provisioning of additional devices can themselves fluctuate dynamically, based on statistical data gathered during earlier stages of a test.

Figure 4B:
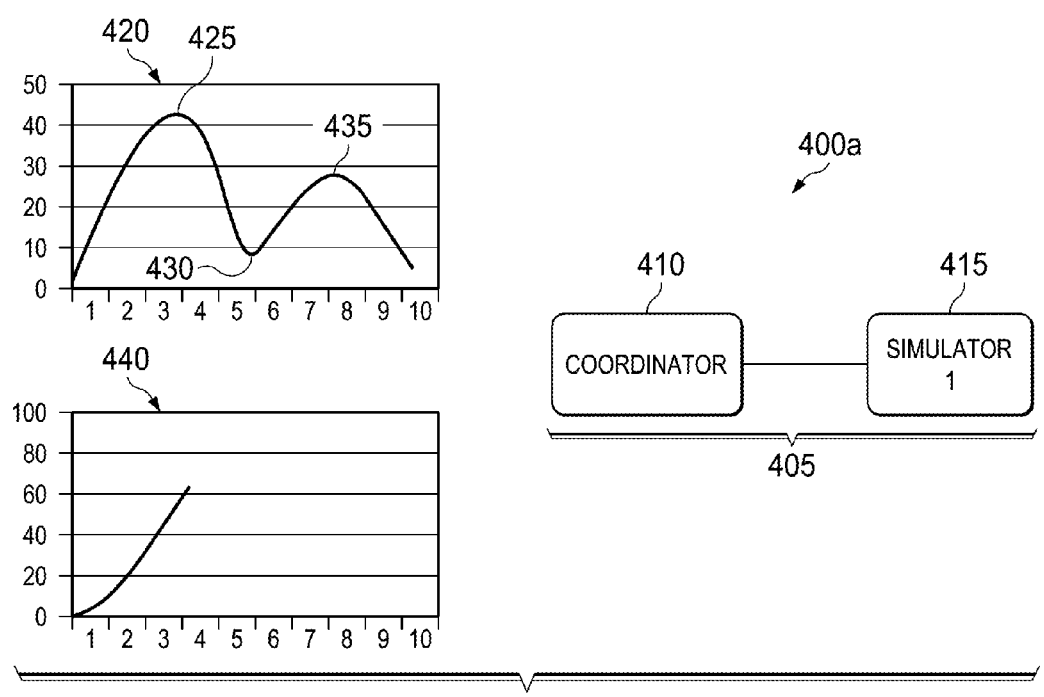
Figure 4C:
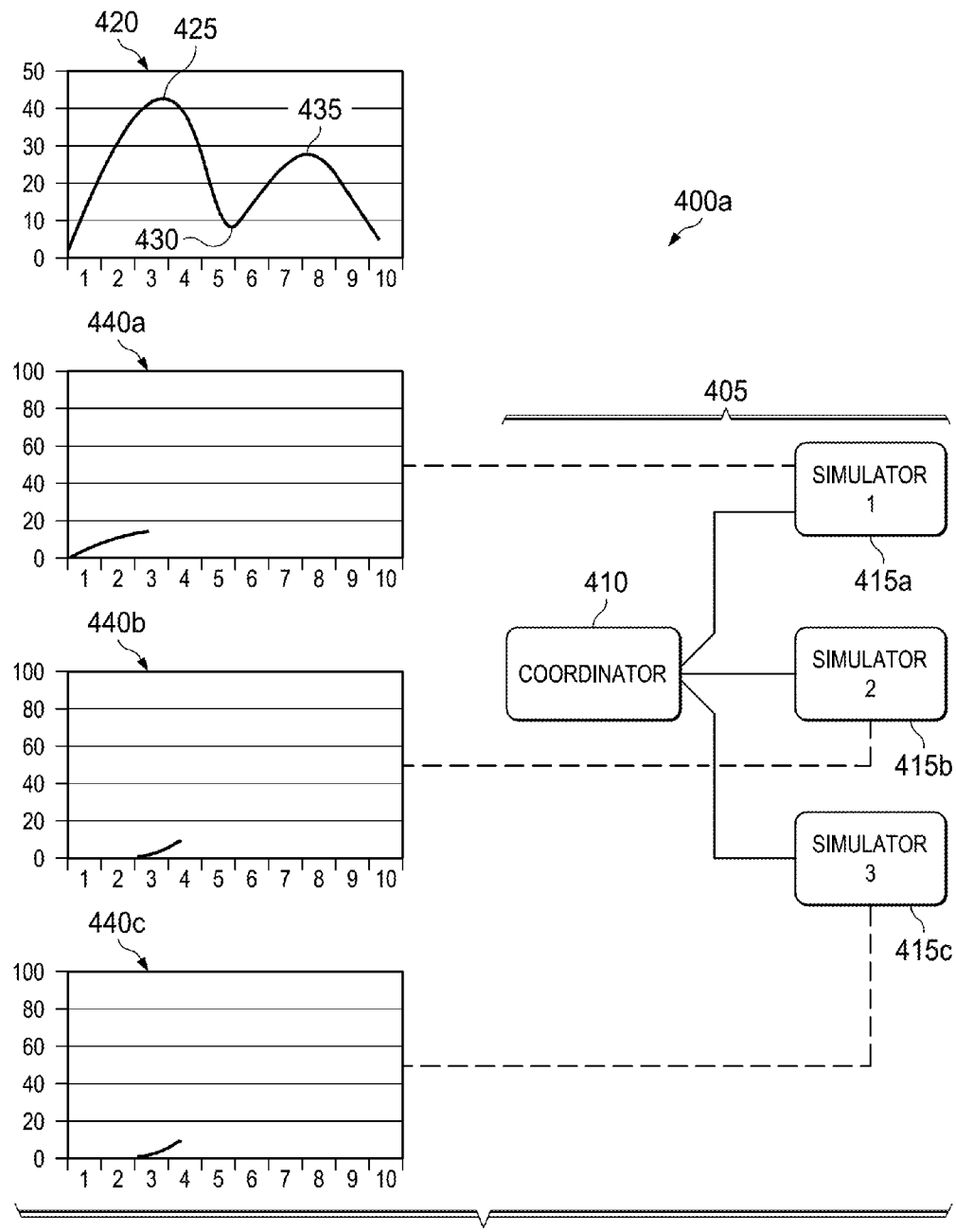

Based on the forecast shown at 440 in FIG. 4B, the test coordinator 410 can elect to allocate and provision additional hardware resources to mirror and/or supplement simulator 415. For instance, in the example of FIG. 4C, two additional simulators (415b and 415c) and computing devices have been provisioned in addition to the originally provisioned simulator 415a, in response to predicting that using the single simulator (415 in FIGS. 4A and 4B) would be insufficient or less than ideal. The test coordinator 410 orchestrates the allocation of these additional devices together with the provisioning of the allocated devices with the resources, virtual machine images, etc. needed to seamlessly integrate the additional computing power and simulators in the test. The test coordinator 410 performs this allocating and provisioning (for simplicity, also referred to collectively as "provisioning") dynamically during the test and without the intervention of a human user. Additionally, in this particular example, the test coordinator 410 has preemptively provisioned these additional computing devices based on a prediction that the trend of the test indicated that the additional computing devices should be provisioned. The effect of this provisioning can be seen, as illustrated at 440a-440c in FIG. 4C, in the respective health measures of each of the three provisioned devices, each trending at a rate that appears to allow for the test to complete without incident.

Figure 4D:
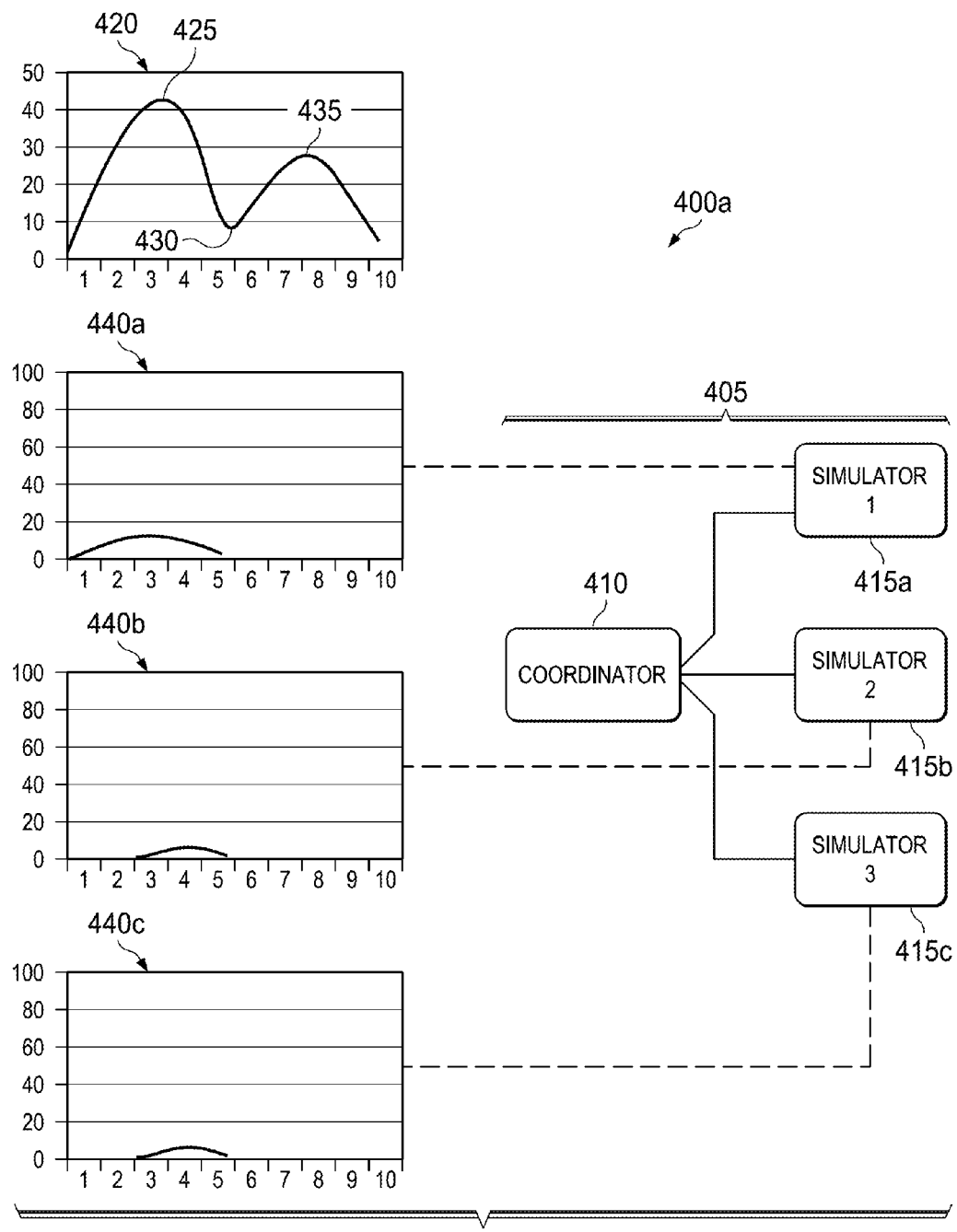
Figure 4E:
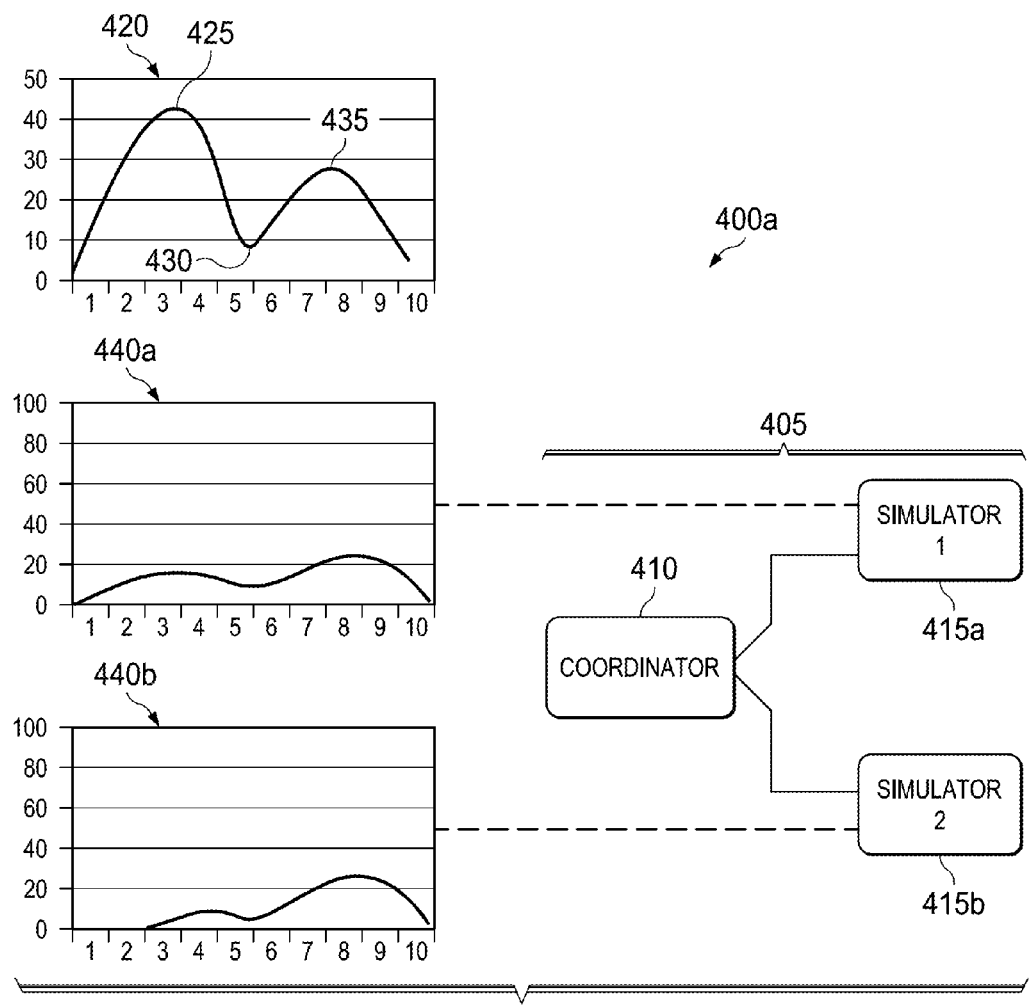

The dynamic provisioning of additional testing hardware during a test can be adjusted according to the needs and progress of a test. From a statistical standpoint, the longer the test is monitored, the more data points will have been gathered by the test coordinator 410 for use in making predictions concerning performance trends and the adequacy of provisioned hardware. Accordingly, a previous decision to provision additional hardware can be amended based on additional data, or subsequent test phases, to add more test servers or de-allocate and tear-down previously-used or -added test servers later determined to be unnecessary, such as shown in the example of FIG. 4D. As shown in the health monitoring graphs 440a-c, hardware resources are (or are predicted to be) underutilized after time t=5. Accordingly, an assessment can be made to de-allocate one of the simulator's devices 415c, as shown in FIG. 4E, based on a prediction that the two simulators 415a, 415b, and corresponding hardware, will be sufficient to complete the test (as shown in health monitoring graphs 440a-b).

Further, while some of the non-limiting examples described above discuss a single, cloud-based "test coordinator" that both gathered data, made hardware assessments based on that data, and provisioned additional resources based on the assessments, other implementations can make use of a persistent test manager in combination with the test coordinator. Indeed, all or a part of the functionality described above can be embodied in one or both of a dynamic (e.g., cloud-provisioned) test coordinator and a persistent test manager. For instance, in one example implementation, a cloud-based test coordinator can monitor and collect data from related cloud-based hardware and transfer this data for further analysis to a persistent test manager. The test manager can act on this data by requesting the dynamic provisioning of additional hardware in connection with the test. The test manager can then request the assistance of the test coordinator in provisioning additional hardware for a test, based on the test manager's assessment. Additionally, and by way of another non-limiting example, the dynamic provisioning of additional hardware for simulators for a particular test can be the domain of the test coordinator, while the dynamic provisioning of additional test coordinators, corresponding to new tests, can be the domain of the test manager (such as with the parallel execution of a suite of test as discussed, for example, below). Other implementations, including implementations utilizing other components or other allocations of functionality between persistent and dynamic computing resources are also within the scope of this disclosure.

While the examples of FIGS. 4A-4E concern execution and monitoring of a single virtual test, in some instances, a single user or organization may wish to complete multiple tests or a suite of tests within a single test session. For instance, a user may request that a plurality of test be completed within a given timeframe. Indeed, implementations making use of cloud infrastructure can also be leveraged to support multiple concurrent tests, including tests of virtualized systems and tests involving the use of virtual services.

Figure 5A:
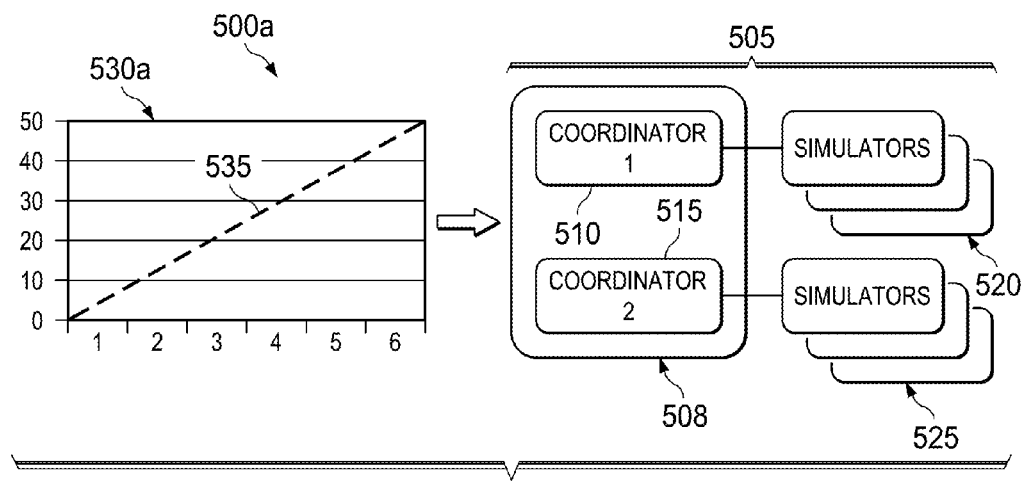
FIGS. 5A-5D illustrate representations of additional example dynamic allocating of computing devices for use in a virtual test environment.

As discussed above, in some implementations, a single test coordinator (e.g., 220 or 410) can be provisioned for each test launched, for example, using a test manager (e.g., 210). Test coordinators can collect data from tests and hardware running the tests and forward this data to a test manager, among other functionality. Turning to the examples of FIGS. 5A-5D, a test environment 505 includes a plurality of test labs each including a test coordinator (e.g., 510, 515) and one or more simulators (e.g., 520, 525). The test environment can allocate and provision a plurality of available test servers for use in executing tests in the test suite. In the specific example illustrated in FIG. 5A, a user has requested that a suite of 50 tests (represented by the y-axis of graph 530a) be executed within a particular time period of 6 hours (represented by the x-axis of graph 530a). As a theoretical matter, in order to complete these tests within the time allotted, it can be initially calculated (e.g., using a test manager (e.g., 210) or one or more test coordinators (e.g., 220)) that tests in the suite be completed at a certain average rate 535. Further to achieve this goal, it is determined, in this particular example, that at least two tests will need to be executed concurrently within test environment 505 at any one time. Accordingly, to achieve this goal, the test environment has been initially provisioned with two coordinators 510, 515 corresponding with two concurrently-executed tests, each having its own set of simulators (520, 525, respectively) responsible for simulating conditions and transactions in the test. In the example of FIG. 5A, more than one test coordinator is executed by a single allocated computing device 508. In other examples, each test coordinator can be executed on a dedicated computing device.

As execution of the suite of tests commences, the initial assumptions regarding how many tests will need to run concurrently can change. For instance, some tests may be executed faster than predicted, while others take longer to execute. As in the examples of FIGS. 4A-4E, as statistical data is collected from the collection of tests being executed within a given session, more reliable predictions can be made, given the ever increasing collection of data points that are gathered during monitoring of the tests' performance. For instance, turning to the example of FIG. 5B, at time t=1.5 hours, only six tests have been completed (or are forecast to have been completed). Further, it can be predicted, based on the statistical data collected over the initially-executed tests, that continuing with the execution of only two concurrent tests at a time will not realize the goal of completing all 50 tests in 6 hours, as indicated by the actual trend line 538a, as forecast at t=1.5. Accordingly, it can be determined, using a test manager, a centralized test coordinator collecting data from each of the test suite's respective test coordinators and managing execution of the suite of tests in a session, that additional test labs should be concurrently launched, in order to keep pace with the session goal. In other words, statistical data collected from the execution of a first portion of the suite of tests can indicate that the mean execution time of the tests was higher than originally predicted, leading to a suggested upgrade in the number of hardware that should be provisioned for the suite of tests.

Figure 5B:
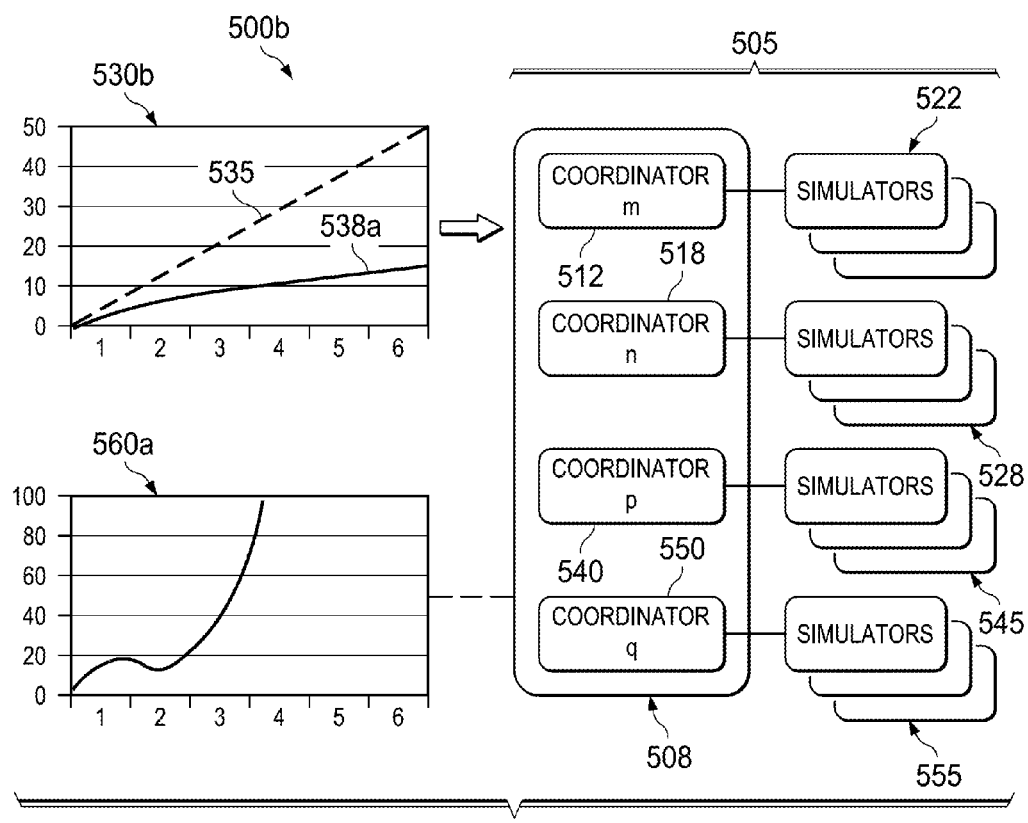

In the example of FIG. 5B, it has been determined that four tests will need to concurrently execute in order to reach the six hour goal. Accordingly, two additional test coordinators (e.g., 540, 550) can be provisioned, along with provisioning of additional hardware for the corresponding test simulator sets 545, 555. While a single computing device 508 was originally provisioned for the testing session for the suite of tests, the originally-provisioned device(s) (e.g., 508) may not be have the capacity to successfully execute additional test coordinators (corresponding to additional, concurrently executed tests). For instance, as shown in FIG. 5B, the doubling of test coordinators executed on device 508 has resulted in an untenable health profile trend 560a for the device 508. Accordingly, as shown in FIG. 5C, the addition of additional, concurrently-executed tests can necessitate the dynamic provisioning of additional computing devices (e.g., 565), for instance, from the cloud.

Figure 5C:
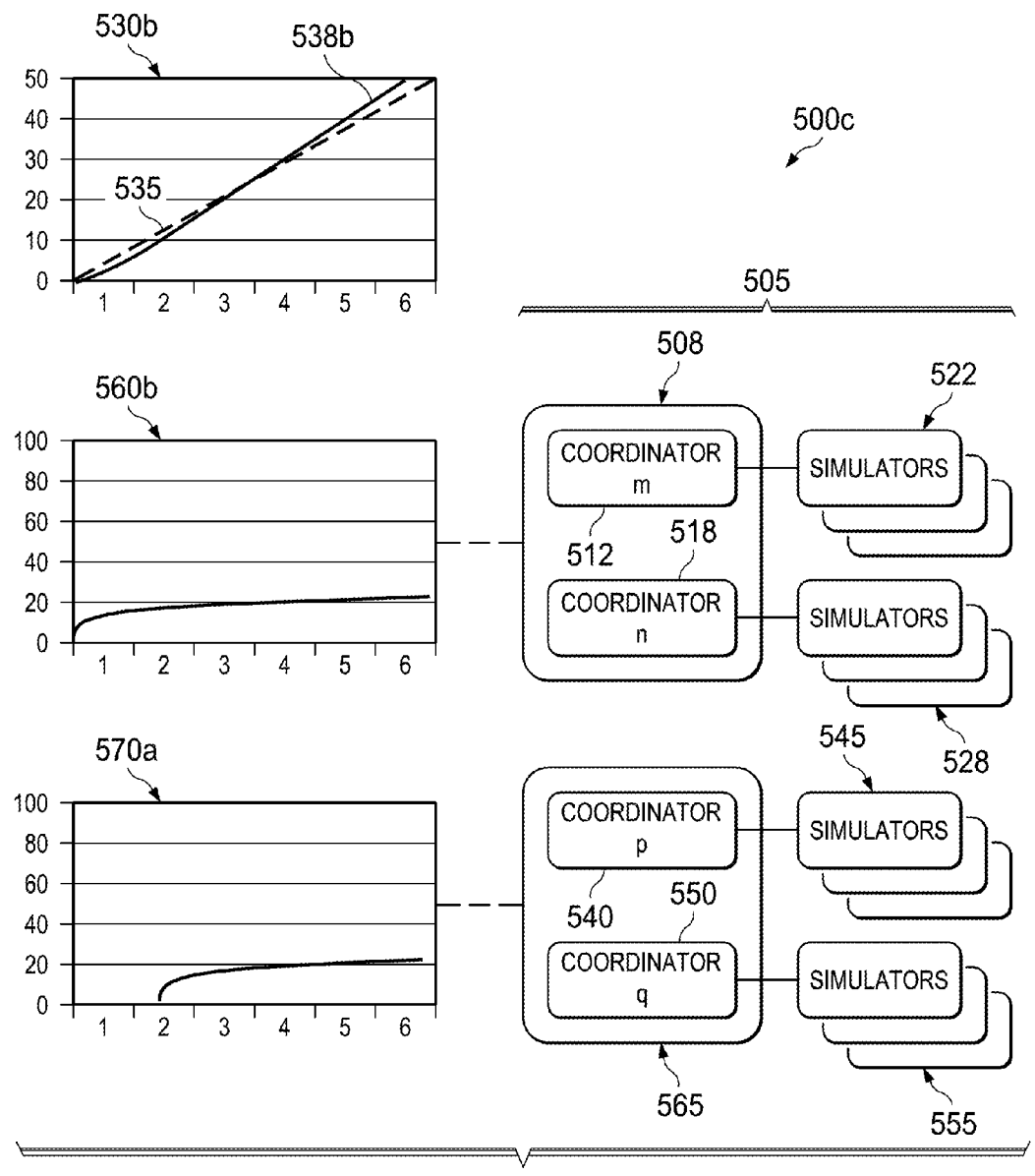
Figure 5D:
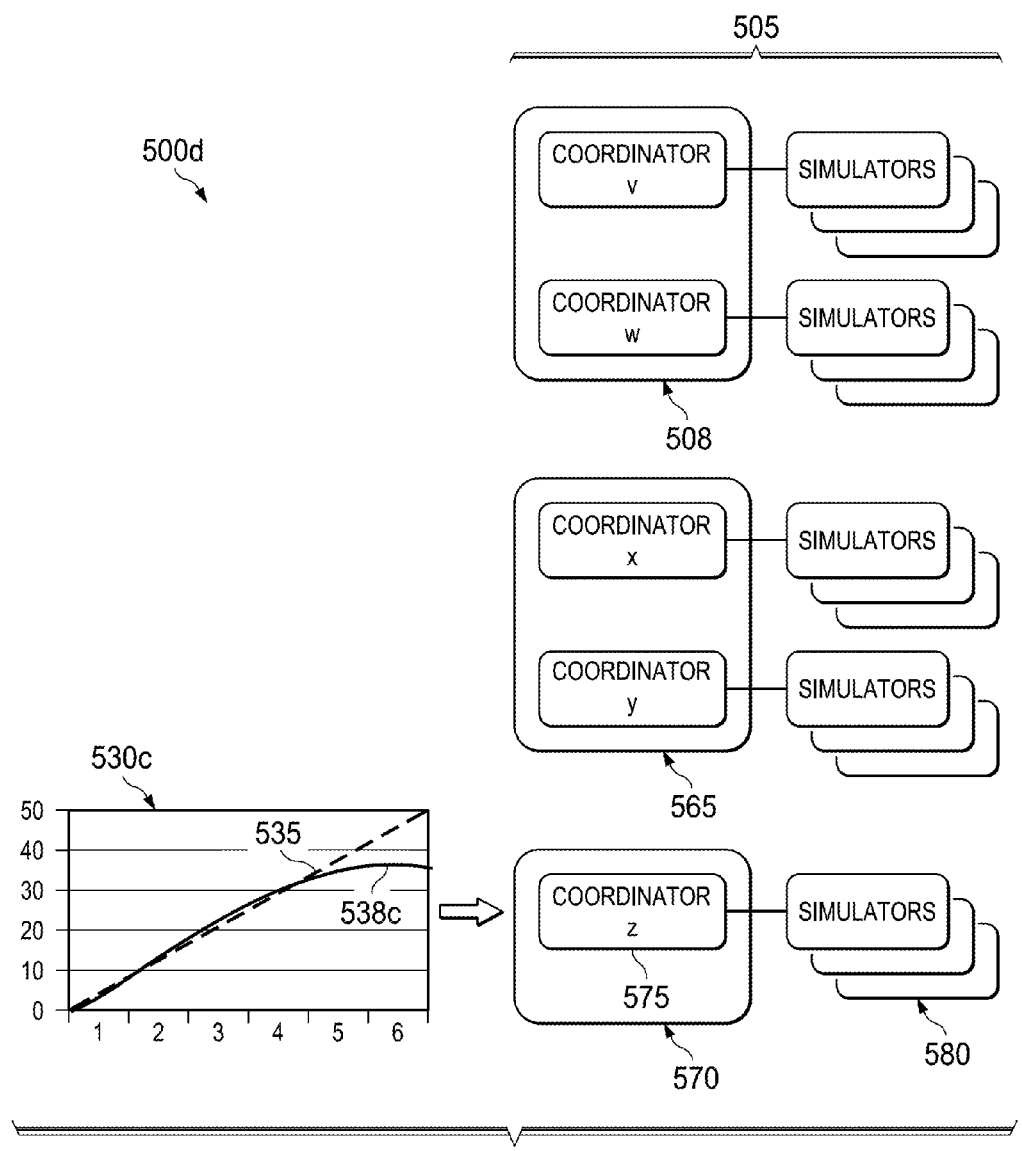

As shown in FIG. 5C, by executing test coordinators 512, 518, 540, 550 on more than one provisioned computing device (e.g., devices 508 and 565), device health can be maintained or predicted over the life of the test (as shown at 560b and 570a). Further, as shown by trend line 538b, using the two provisioned computing devices 508, 565 in connection with the execution of at least four concurrent tests (and corresponding test coordinator tools), the testing of the suite appears to be set to meet the originally defined six hour goal. Assumptions and trends can change, however, as additional samples and data are collected from monitoring of the tests' progress, even after the provisioning of additional computing devices (e.g., 565) that appear to fulfill the needs of the test. For instance, as shown in FIG. 5D, at t=4.5 hours, a trend (shown at 538c) can be identified that requires the addition of still more computing devices. Accordingly, in the example of FIG. 5D, in order to address trend 538c, the execution of an additional concurrently-executed test is added, along with the provisioning of one or more additional computing devices (e.g., 570) to accommodate the corresponding, additional test lab (and test coordinator 575). In this way, a testing system can monitor itself and intelligently self-correct, in an at least partially iterative manner, predicted shortfalls (or excesses) in provisioned computing resources.

In some instances, rather than determining that a particular number of tests be concurrently executed at a given time throughout a test session, a particular number of computing devices can be allocated to handle the execution of a set of concurrent tests. In principle, this proceeds in a manner similar to the examples illustrated in FIGS. 5A-5D, with the concurrent testing being constrained by the number of tests that can potentially be run on a particular allocated set of computing devices, rather than artificially constrained by a pre-set number of tests that are to be concurrently executed. The allocated set of computing devices can be provisioned to execute any combination of simulators and coordinators needed during the concurrent execution of the tests. Further, the test manager can determine when tests in the suite are to run, so as to maximize or optimize the available computing devices allocated for the testing session. For example, if a first test is being run using 80% of the available allocated test servers, and a second concurrent test has just ended that used 10% of the remaining allocated test servers, the test manager tool can attempt to identify another test that the test manager tool predicts will also utilize approximately 10% of the allocated resources. Further, as assumptions concerning the test outlay change (e.g., if testing falls behind a pace needed to complete a suite of tests), additional test servers can be allocated, as in the preceding examples, both to accommodate concurrent testing of certain combinations of tests that unexpectedly overwhelm the provisioned computing resources, as well as to accommodate meeting particular testing time deadlines, or test completion rates.

In still additional examples, it should be appreciated that principles of the examples of FIGS. 4A-4E (focused on the monitoring and dynamic provisioning of hardware for a single test) and the examples of FIGS. 5A-5D (focused on monitoring and dynamic provisioning in order to accommodate concurrent testing) can be combined. For instance, while computing devices are monitored and dynamically provisioned to accommodate additional tests and test coordinators for concurrent execution of a suite of tests (as in FIGS. 5B-5C), individual tests in the suite, through their individual test coordinator tools, can, at the same time, be initiating the dynamic provisioning of additional test servers (e.g., to add test simulators for the test) in connection with attempting to realize successful completion of the individual tests (as outlined in connection with the example of FIGS. 4A-4E). For instance, after test server 565 is added (in FIG. 5C) to accommodate test coordinator 540, an initial set of test servers provisioned for corresponding simulators 545 can monitored by test coordinator 540 and then expanded by dynamically provisioning additional computing devices for executing additional simulators 545. Indeed, in some instances, in order to hasten execution of a particular suite of tests, test servers can be added not only to facilitate provisioning of additional test coordinator tools for additional tests (as in FIGS. 5A-5D), but additional test servers can also be allocated and provisioned with additional simulators, upon predicting that adding additional simulators to a particular test in the suite is likely to speed-up execution of the particular test, and thereby also the completion of the entire test suite.

Figure 6:
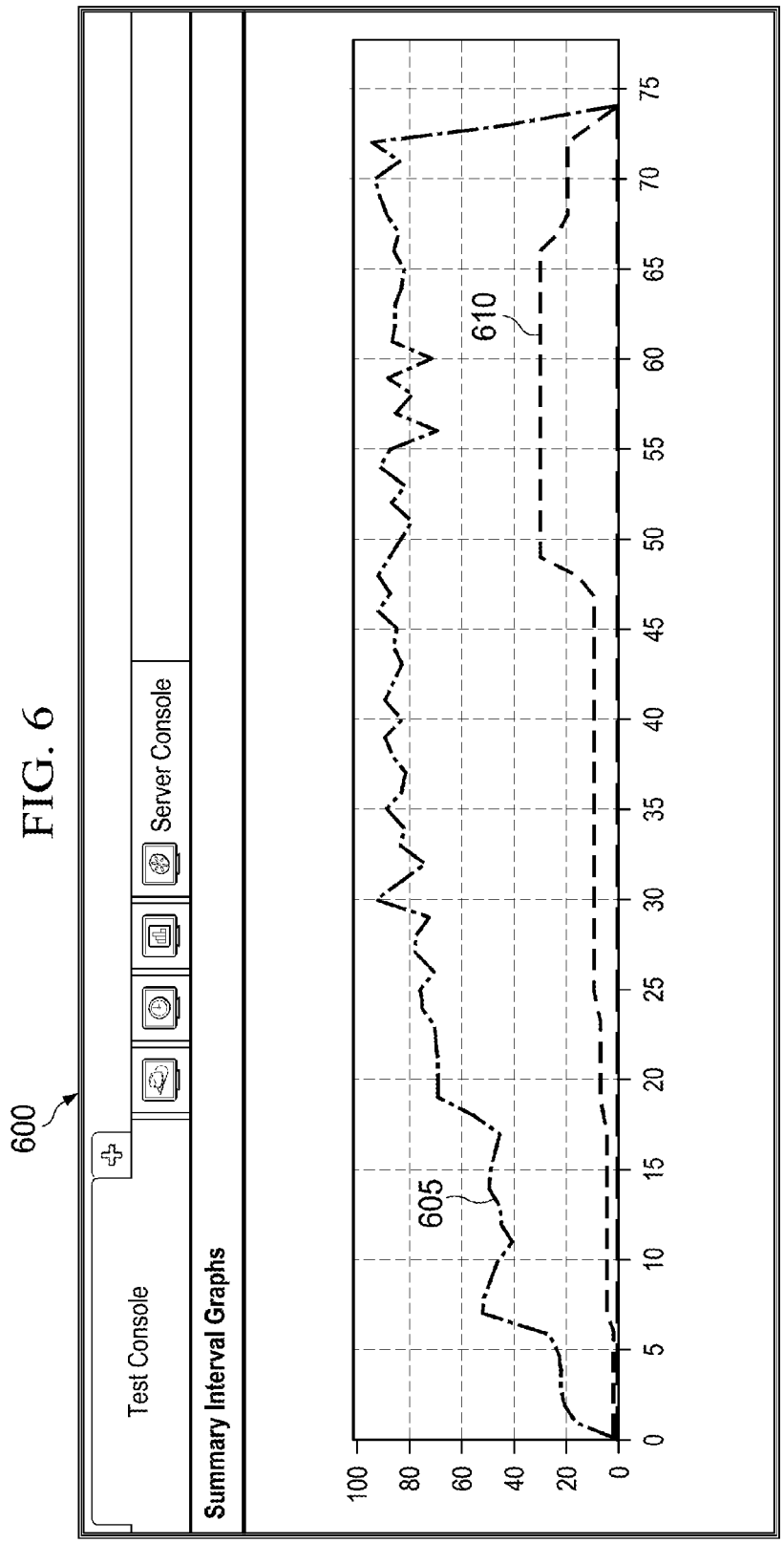
FIG. 6 illustrates a status graph of an example software load test using a virtual test environment.

It is important to note that the examples illustrated and described in connection with FIGS. 4A-4E and 5A-5D are simplified examples, presented for convenience in introducing and describing particular concepts. Indeed, the real world test flows, threshold values and algorithms used to trigger dynamic provisioning of test hardware, load patterns, health monitoring data, trend lines, test labs, monitoring techniques, and simulator outlays, can be far more complex than (but, in some cases, as simple as) the examples and systems described in connection with FIGS. 4A-4E and/or 5A-5D. As but one example, FIG. 6 shows an example performance graph outlining monitoring of a particular real-world load performance test, including monitoring of the load pattern 610 tested against a computing system under test, as well as the number of transactions per second 605 executed by one or more provisioned computing devices used in the execution of the test. Other examples can include plots and representations of other measures and statistics. Further, it is also important to note that potentially limitless test types, simulator types, test plans, etc. can be accommodated using virtual testing systems implementing principles similar to those described above.

Figure 7A:
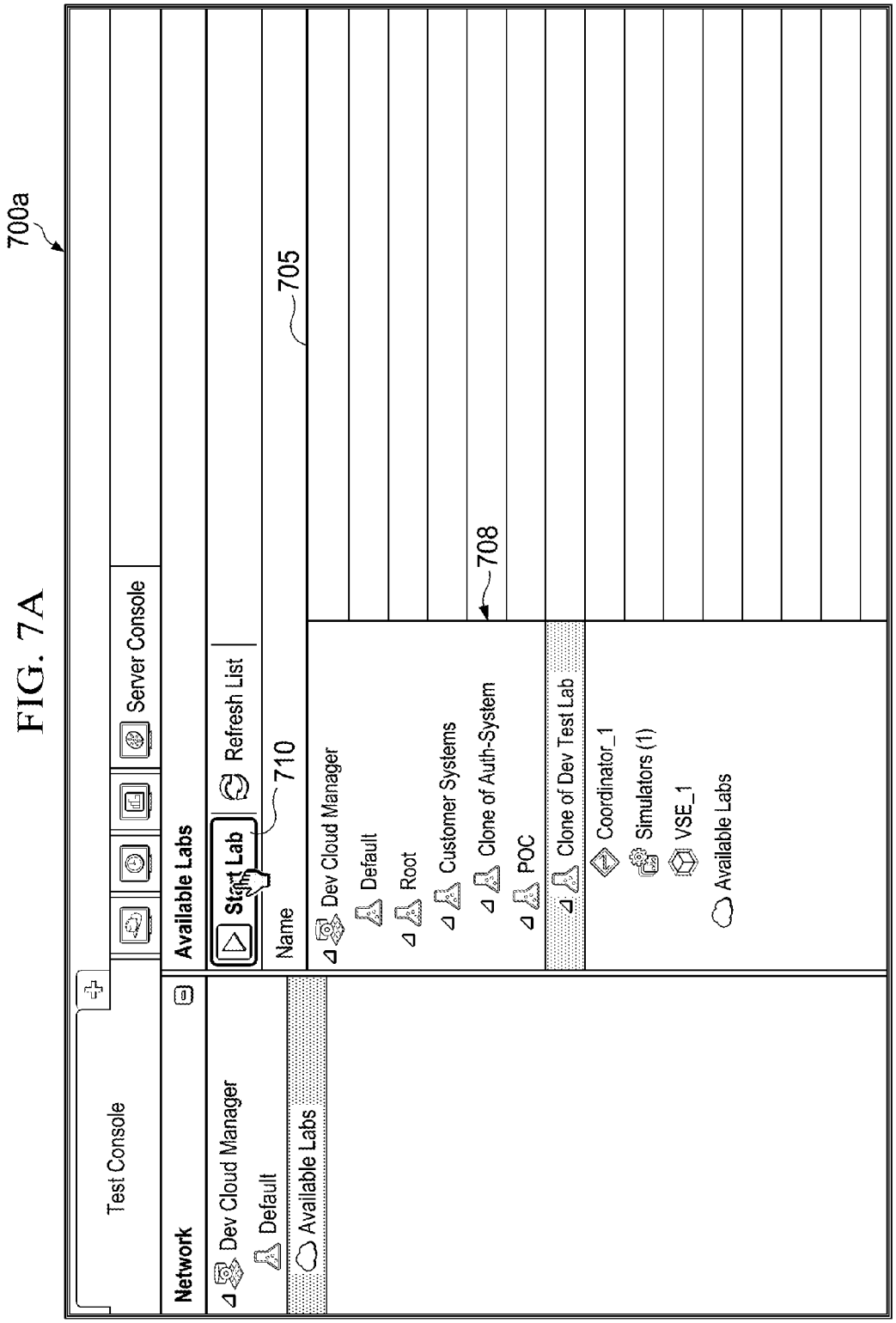
FIGS. 7A-7C illustrate example screenshots of UIs used in connection with a virtual test manager.
Figure 7B:
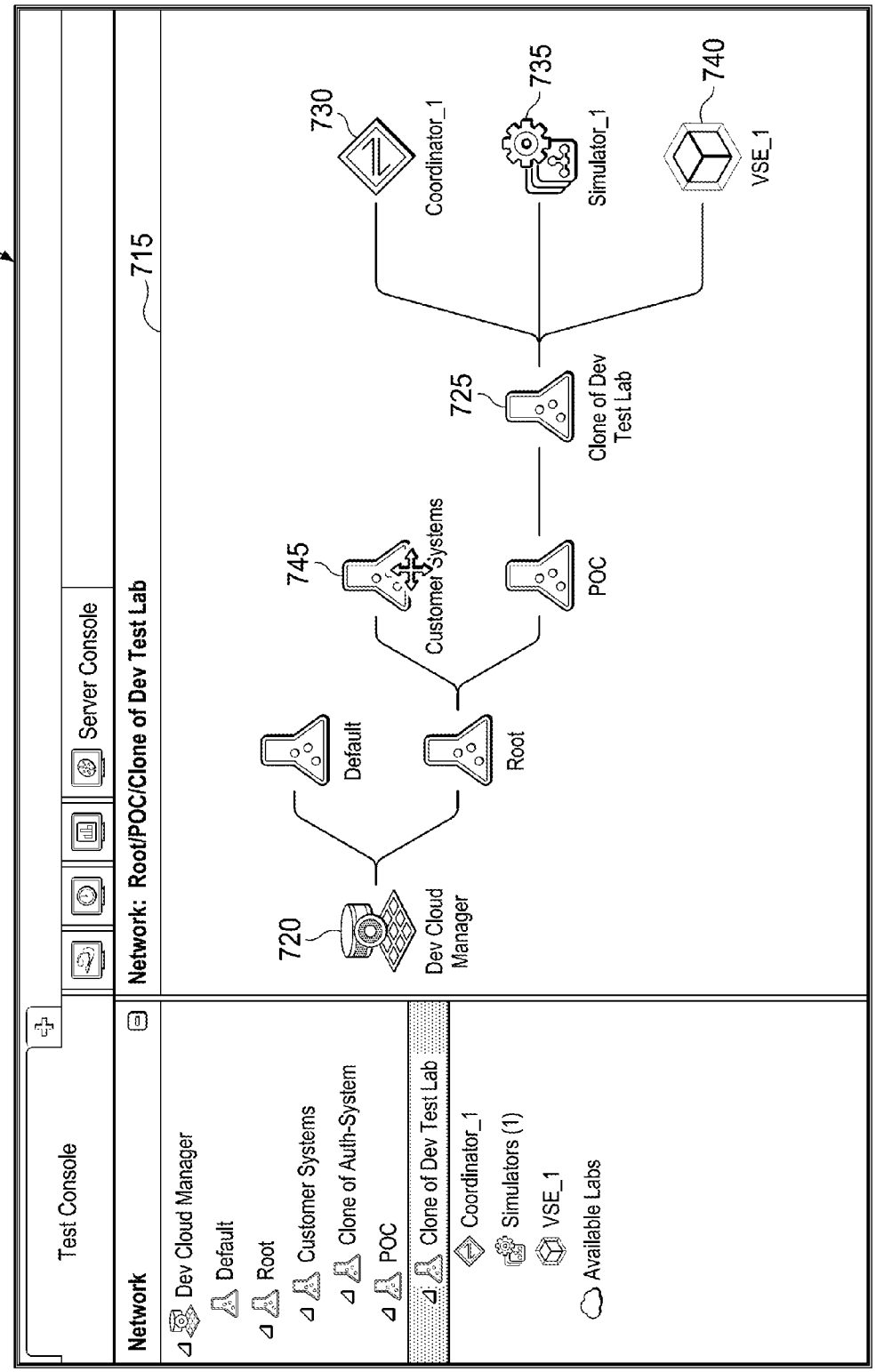
Figure 7C:
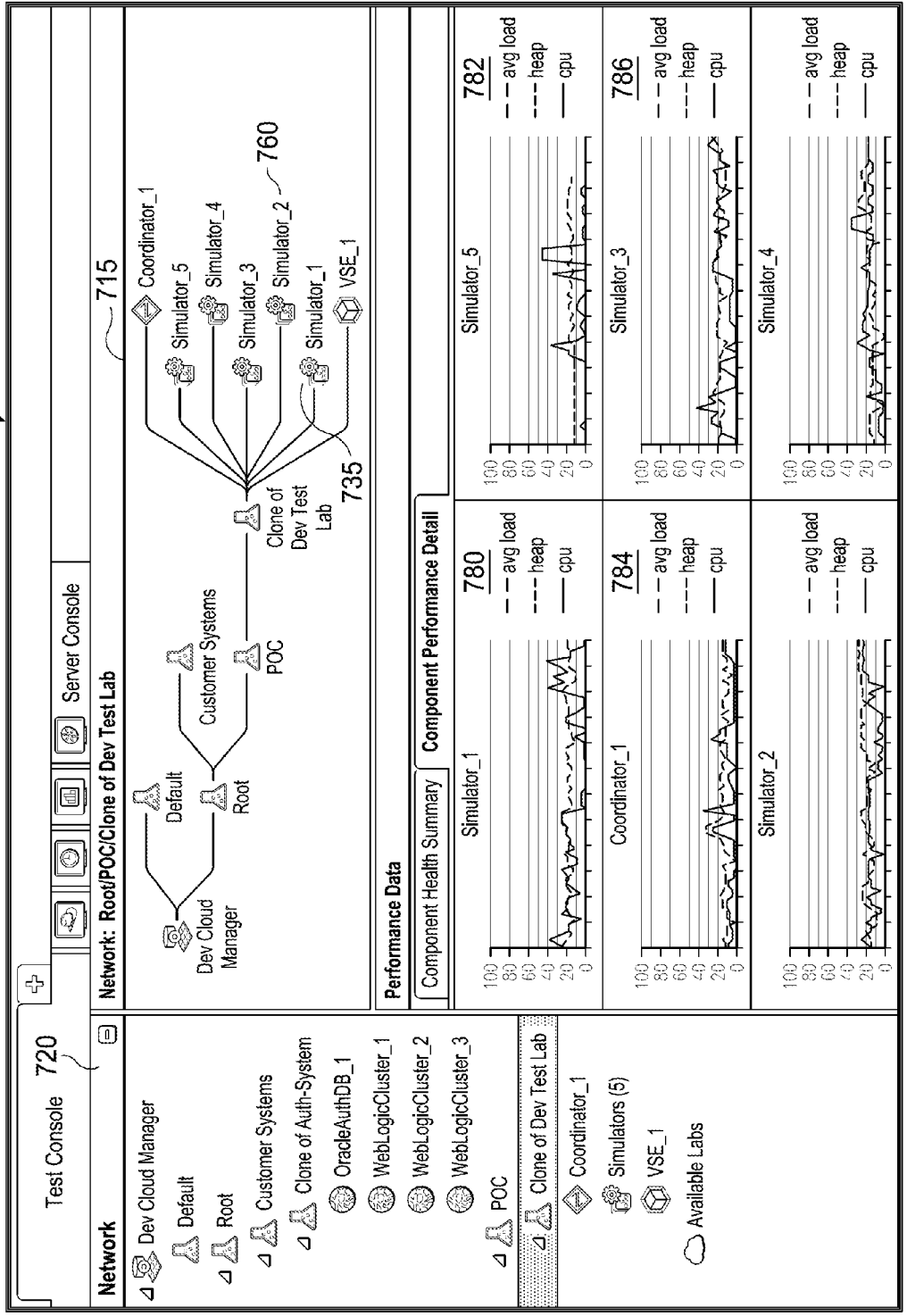

By way of additional illustration, and in one particular example, a virtual testing system with functionality similar to that described above, can be accessed, controlled, and/or monitored, by human users by way of computing devices (e.g., 102, 104) that include graphical display capabilities. To illustrate certain simplified features of one implementation of an example virtual testing system, FIGS. 7A-7C show certain simplified representations of screenshots and views 700a-c that could be displayed to users in connection with the set-up and execution of a test in a virtual test lab dynamically provisioned using a virtual testing system. For instance, FIG. 7A illustrates a view 700a of a user interface for use, by a user, in launching one or more virtual test labs. The user can navigate a collection of test labs using window 705 and select one or more particular test labs (e.g., 708) included in the collection. By pressing the "Start Lab" button 710 in the interface, the selected test lab can be initiated, for instance, by dynamically requesting the allocation of a set of on-demand servers and dynamically provisioning the allocated servers with the resources of the selected test lab. Using such an interface, the provisioning of a virtual testing environment can be initiated and completed swiftly and simply, with the test manager tool performing the remaining transactions and operations to set-up the test lab on the cloud. In some instances, selecting the "Start Lab" button 710 can conveniently result in the full provisioning and initiation of a test lab without further input from the user.

Turning to FIG. 7B, a view 700b of another example user interface is shown. In the example of FIG. 7B, a schematic representation of a provisioned test is presented to a user in window 715. Icons 720-745 can be included and displayed, representing persistent and dynamic components of the test environment participating in the launch of the test. For instance, in the example of FIG. 7B, a test has been launched by a test manager 720 making use of a particular development test lab 725 testing one or more components of a particular computing system. The user interface further presents the components included in the test lab 725 itself, including a test coordinator 730 provisioned on cloud infrastructure, an initial set of one or more test simulator 735 provisioned on cloud infrastructure, and a virtual service environment (VSE) 740 virtualizing the system under test (also provisioned on the cloud). Through the use of virtual services made available through VSE 740, the test simulators 735 can interact with and test a virtualized version of the system under test, provisioned on the cloud as one or more virtual services, rather than testing the live system itself. Additionally, the VSE 740 can provide virtual services virtualizing dependencies of the system under test.

As the test progresses, the test manager 720 and/or test coordinator 730 monitors the test's progress, as well as the performance of the provisioned devices implementing the test, to determine if additional devices should be dynamically provisioned. To assist the user in understanding the progress of the test and the automatic provisioning (or de-allocation) of any additional test servers, additional data can be presented to the user via the user interface in FIG. 7B. For example, as shown in the example of FIG. 7C, additional simulators 760, 765, 770, 775 have been dynamically provisioned on additional corresponding devices, for instance, in response to determining that additional simulators were needed to complete the test. Additionally, test server health status can be conveyed to the user graphically via windows 780-790. Each status window 780-790 corresponds to a particular one of six computing devices provisioned by the system for the test coordinator 730 and simulators 735, 760, 765, 770, 775. The status windows 780-790 can display and synthesize data documenting or representing the device's health and capacity as monitored, for example, by the test manager 720 and/or test coordinator 730 during the course of the test. For instance, in the example of FIG. 7C, windows 780-790 convey information including each provisioned server's respective memory ("heap"), CPU capacity ("cpu"), as measured against the average load ("avg load") borne by the respective test server over time. With the information presented in window 715, showing the addition (and/or subtraction) of provisioned servers (and simulators, test coordinators, etc.), together with the information presented in windows 780-790, users can monitor how the virtual testing system is responding to the dynamically-changing hardware requirements of the test. Such information can be further used to inform users monitoring the interfaces of FIGS. 7B and 7C of how to build better tests in the future, adjust assumptions and instructions for a test (such as a maximum number of servers to be allocated to the test or the assessment rate for the test), and can even make adjustments to the test, during testing (such as adding or changing assessment checkpoints), to reflect knowledge gleaned from the test's performance.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems (e.g., system 100) may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system (e.g., 100). A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method comprising:
    sending first data to cause at least one test of a first computing system to be launched utilizing a second computing system, wherein the second computing system initially comprises a first set of computing devices;
    monitoring progress of the test during a first period of time;
    monitoring performance of the second computing system during the first period; and
    sending second data during the first period to cause an additional, second set of computing devices to be automatically provisioned for inclusion in the second computing system in response to the second data, wherein the second data is sent based at least in part on results of the monitoring of the test progress and results of the monitoring of the performance of the second computing system during the first time period;
    wherein the test utilizes the first and second sets of computing devices during a second period of time subsequent to the first period and the test persists from the first period to the second period.

2. The method of claim 1, wherein the first and second sets of computing devices are remote from the first computing system.

3. The method of claim 1, wherein each device in the first set of computing devices executes at least one respective instance of a virtual test lab configured to simulate a set of interactions with the first computing system, and the virtual test lab is executed on at least one of the first set of computing devices and automatically provisioning the second set of computing devices includes provisioning at least one respective instance of the virtual test lab on at least one of the second set of computing devices.

4. The method of claim 3, wherein each instance of the virtual test lab is executed using at least one first virtual machine and a virtual instance of the first computing system is tested, the virtual instance of the first computing system executed using at least one second virtual machine.

5. The method of claim 1, wherein monitoring the test during the first time period includes predicting requirements of the test in the second period of time and the second set of computing devices are provisioned based, at least in part, on the predicted requirements of the test.

6. The method of claim 1, wherein monitoring performance of the second computing system includes monitoring computing capacity of the first set of computing devices.

7. The method of claim 6, wherein computing capacity includes at least one of processing capacity of computing devices in the second computing system, available network bandwidth within the second computing system, and available memory of computing devices in the second computing system.

8. The method of claim 1, wherein the first and second sets of computing devices are provisioned from a plurality of cloud-based server devices.

9. The method of claim 1, further comprising:
    monitoring performance of the second computing system during the second period, the second computing system including the first and second sets of computing devices; and
    determining, based at least in part on monitoring performance of the second computing system during the second period, whether additional computing devices should be added to the second computing system in a third period subsequent to the second period.

10. The method of claim 9, further comprising determining, based on the monitoring of the second computing system during the second period, that at least a portion of the computing devices provisioned to the second computing system be at least temporarily de-allocated from the second computing system.

11. The method of claim 1, wherein at least one particular computing device, remote from the first computing system and within the second computing system, executes at least one test coordinator engine managing the test.

12. The method of claim 11, wherein the at least one test coordinator engine monitors the test, monitors performance of the second computing system, and initiates dynamic provisioning of additional computing devices for inclusion within the second computing system during the test.

13. The method of claim 1, further comprising identifying user-defined parameters for the test, wherein dynamic provisioning of additional computing devices for inclusion within the second computing system during the test is based at least in part on the parameters.

14. The method of claim 13, wherein the parameters include at least one of:
 a monitoring rate defining when performance of the second computing system should be monitored in connection with decisions to initiate dynamic provisioning of additional computing devices for inclusion within the second computing system during the test;
 an initial system size for the second computing system; and
 a maximum system size for the second computing system, wherein the second computing system will not be automatically provisioned with additional computing devices in excess of the maximum system size.

15. The method of claim 1, wherein the at least one test includes a plurality of tests, the plurality of tests including a first test and a second test executed at least partially in parallel, wherein each test in the plurality of tests has a corresponding test coordinator engine executed on the second computing system.

16. The method of claim 15, wherein monitoring of the at least one test includes determining whether additional computing devices should be automatically provisioned to accommodate execution of test coordinator engines for at least the first and second tests.

17. The method of claim 15, further comprising:
 identifying user-defined parameters for the at least one test, the parameters including instructions for completing each of the plurality of tests within a particular time period, the particular time period including at least the first and second periods of time,
 wherein the performance of the second computing system during the first period is monitored to determine whether additional computing devices should be automatically provisioned for inclusion in the second computing system in order to complete the plurality of tests within the particular time period.

18. The method of claim 1, wherein performance of the second computing system is monitored substantially continuously during the test and decisions to automatically provision the second computing system with additional computing devices are made substantially periodically.

19. The method of claim 1, wherein the test persists from the first period to the second period such that the provisioning of the second set of computing devices does not interrupt the test.

20. An article comprising a non-transitory, machine-readable storage device storing instructions operable to cause at least one processor to perform operations comprising:
 sending first data to cause at least one test of a first computing system to be launched utilizing a second computing system, wherein the second computing system initially comprises a first set of computing devices;
 monitoring progress of the test during a first period of time;
 monitoring performance of the second computing system during the first period; and
 sending second data during the first period to cause an additional, second set of computing devices to be automatically provisioned for inclusion in the second computing system in response to the second data, wherein the second data is sent based at least in part on results of the monitoring of the test progress and results of the monitoring of the performance of the second computing system during the first time period;
 wherein the test utilizes the first and second sets of computing devices during a second period of time subsequent to the first period and the test persists from the first period to the second period.

21. A system comprising:
 a memory element storing data;
 a processor operable to execute instructions associated with the stored data; and
 at least one test management engine configured to:
  send first data to cause at least one test of a first computing system to be launched utilizing a second computing system, wherein the second computing system initially comprises a first set of computing devices;
  monitor progress of the test during a first period of time;
  monitor performance of the second computing system during the first period; and
  send second data during the first period to cause an additional, second set of computing devices to be automatically provisioned for inclusion in the second computing system in response to the second data, wherein the second data is sent based at least in part on results of the monitoring of the test progress and results of the monitoring of the performance of the second computing system during the first time period;
 wherein the test utilizes the first and second sets of computing devices during a second period of time subsequent to the first period and the test persists from the first period to the second period.

* * * * *